Patented Apr. 12, 1949

2,467,223

UNITED STATES PATENT OFFICE 2,467,223

PREPARATION OF FORMALDEHYDE

Willard A. Payne, Charleston, W. Va., assignor to E. I. du Pont de Nemours & Company, Wilmington, Del., a corporation of Delaware No Drawing. Application January 11, 1945, Serial No. 572,439

7 Claims. (Cl. 260—606)

This invention relates to a process for the preparation of formaldehyde by the catalytic oxidation of methylal.

In the oxidation of methanol or dimethyl ether to formaldehyde, water is one of the products of the reaction and accordingly a fairly dilute aqueous solution of formaldehyde is obtained even with quantitative conversion of the alcohol or ether to formaldehyde. The reactions illustrate this:

(1) $CH_3OH + 1/2 O_2 \rightarrow CH_2O + H_2O$
(2) $CH_3OCH_3 + O_2 \rightarrow 2CH_2O + H_2O$ There are many uses for concentrated aqueous solutions of formaldehyde and accordingly if the aldehyde is made by either the catalytic oxidation of methanol or dimethyl ether considerable amounts of water are formed simultaneously with the aldehyde necessitating a subsequent dehydration step in order to provide a concentrated aldehyde.

An object of the present invention is to provide a process for the preparation of concentrated aqueous solutions of formaldehyde. Another object is to provide a process for the preparation of formaldehyde by the oxidation of methylal. Yet another object is to provide catalysts for effecting the oxidation. Other objects and advantages of the invention will hereinafter appear.

According to the present invention formaldehyde is prepared by passing a gaseous mixture of methylal and oxygen or air into contact, under suitable reaction conditions, with a suitable catalyst for the reaction and for this purpose methanol oxidation catalysts may be used. The reaction is effected in accord with the equation:

(3) $CH_3OCH_2OCH_3 + O_2 \rightarrow 3CH_2O + H_2O$.

By a comparison of Equation (3) with Equations (1) and (2) it will be apparent that the amount of water formed by the process of Equation (3) is less than that formed in either the process of Equation (1) or (2). The molar ratio of formaldehyde to water in Equation (1) is 1:1, in Equation (2) 2:1, and Equation (3) 3:1. It is apparent from a comparison of these equations that by the use of methylal it is possible to obtain directly a solution containing, on a weight basis, 83.3% formaldehyde while from dimethyl ether only a 77% solution and from methanol only 62.3% solutions are theoretically obtainable. This and other advantages are realized in producing formaldehyde by the process of the invention.

Any suitable methanol oxidation catalyst may be used for the methylal oxidation reaction such, for example, as silver gauze, copper oxide, the manganese, molybdenum, vanadium, iron molybdate, or other highly active catalysts, such as the molybdenum catalysts activated with iron, manganese, magnesium, cadmium or calcium, or the phosphorus and the molybdic oxide containing catalysts which have been activated by manganese, magnesium, cadmium or calcium. These catalysts are charged into a reaction zone and the vapors of methylal together with air or oxygen introduced, the reaction being conducted at temperatures ranging from 200 to 500° C. and preferably between 300 to 400° C.

The reaction should be conducted in the presence of sufficient air or oxygen to convert the methylal in accord with Equation (3) to formaldehyde. If the reducible metal oxide catalysts are used disposed in a tubular reaction zone, sufficient air should be present in excess to maintain all of the catalysts and especially the catalyst at the exit end of the zone in an oxidizing atmosphere; otherwise, loss of catalyst activity will result from reduction of the catalyst. The reaction will proceed with an air to methylal weight ratio of from about 18:1 to about 8:1 and in order to avoid explosive mixtures it is usually advisable to employ a gas containing less than about 10% of oxygen or more than about 37% oxygen on a methylal free basis. The low concentrations may be provided by recycling the gas thereby building up the nitrogen content so that the entering gas is reduced to in the order of 10% oxygen or a gaseous mixture employed which contains initially but 10% oxygen, the remainder being nitrogen or another inert gas.

The oxidation of methylal to formaldehyde may be carried out if desired in a continuous manner and to do so it is advisable to build up within the system conditions which make it possible to carry out the reaction with safety. This may be accomplished by introducing, into a reaction zone which may be a tubular or other suitable converter charged with catalyst, a mixture of air and methylal with a ratio of 14:1 or higher amounts of air. The converter prior to the admission of the gaseous mixture may be charged with a molybdic oxide catalyst promoted with iron oxide, the catalyst being brought up to reaction temperature by any suitable means. The gases issuing from the converter are passed into a scrubber for the removal of formaldehyde, in which the scrubbing liquid may be a concentrated aqueous solution of formaldehyde or an organic solvent for the formaldehyde. This scrubbed gas is recycled to the converter and introduced with controlled amounts of fresh air. These operations are continued until the oxygen content of the gases, other than methylal, has dropped to below the explosive limit, say about 10 volume percent oxygen. The methylal concentration is then increased to the desired value in order to consume all but a small amount of oxygen, say about 2.5% in the exit gas from the converter to maintain the catalyst in an active condition. If a non-reducible catalyst is used, the methylal concentration may be increased until all of the oxygen is consumed.

When the above conditions have been established continuous operation may be carried out as described in Example 1 wherein parts are by weight unless otherwise designated.

*Example 1.*—After starting the process as above described, the reaction is continued by passing 100 pounds of methylal per hour into the reaction converter simultaneously with the introduction of 211 lbs. per hour of air and 1189 lbs. per hour of recycled gas. The spent gases issuing from the water scrubbing operation are recycled after purging 169 lbs. of recycled gas per hour from the system. By operating in this manner the oxygen in the purged gas and in the recycled gas is approximately 3.5 volume percent and that introduced into the converter is approximately 6.1 volume percent. By operating in this manner, substantially 95% of the methylal is converted to formaldehyde with the formation of much less water than in the oxidation of methanol or methyl ether. Moreover, the process operates smoothly without frequent shutdowns due to run-away reactions, catalyst degradation and explosive difficulties.

*Example 2.*—A chamber containing a nest of vertical catalyst tubes is charged with a catalyst, containing on an atomic weight basis 1 atom of manganese and 5 atoms of molybdenum prepared by kneading, in the presence of 80 parts of water, 29 parts of manganese nitrate and 88 parts of ammonium molybdate, drying the paste, heating to 400° C. and crushing to 14 to 20 mesh screen size. After starting the process as described, methylal is introduced at a space velocity of 550 to 551 cubic feet per hour per cubic foot of catalyst and is oxidized with a gas containing 8.5% oxygen and 91.5% nitrogen. The reaction is conducted at a hot spot temperature between 430 and 470° C. With a catalyst bed of 7 inches in depth in each tube, excellent conversion to formaldehyde is realized.

The process is described as involving the oxidation of methyal although it will be understood that this formal may be oxidized in the presence of other compounds, such, for example, as methanol, or dimethyl ether which also are oxidized to formaldehyde and when oxidized in the presence of methylal, the amount of water is increased or diminished in accord with the amounts of the methanol or ether used. If more concentrated formaldehyde is desired, the cyclic formal 1,3-dioxolane may be introduced as it may be oxidized to formaldehyde without the formation of any water.

I claim:

1. A process for the catalytic oxidation of methylal to formaldehyde which comprises oxidizing methylal with oxygen to formaldehyde in the vapor phase and in the presence of a methanol oxidation catalyst.

2. A process for the catalytic oxidation of methylal to formaldehyde which comprises oxidizing methalal with oxygen to formaldehyde in the presence of a methanol oxidation catalyst at a temperature between 200 and 500° C.

3. A process for the catalytic oxidation of methylal to formaldehyde which comprises oxidizing methylal with oxygen to formaldehyde in the presence of a methanol oxidation catalyst at a temperature between 300 and 400° C.

4. A process for the catalytic oxidation of methylal to formaldehyde which comprises passing a gaseous mixture of methylal and oxygen through a reaction zone charged with a methanol oxidation catalyst and conducting the oxidation of the methylal therein at a temperature between 200 and 500° C. by direct contact with the catalyst.

5. A process for the catalytic oxidation of methylal to formaldehyde which comprises passing a gaseous mixture of methylal and oxygen into contact with a methanol oxidation catalyst at a temperature between 200 and 500° C., there being present in the gaseous mixture sufficient inert gases to give at no time during the reaction more than 10 volume percent oxygen.

6. The process in accord with claim 5 in which a non-reducible methanol oxidation catalyst is used and in which the methylal is introduced in such quantities that the gases issuing from the reaction zone contain not less than 1.0% oxygen.

7. The process in accord with claim 6 in which a reducible metal oxide methanol oxidation catalyst is used and in which the methylal is introduced in such quantities that the gases issuing from the reaction zone contain not less than 2.5% oxygen.

WILLARD A. PAYNE.

REFERENCES CITED

The following references are of record in the file of this patent:

UNITED STATES PATENTS

| Number | Name | Date |
| --- | --- | --- |
| 868,320 | Blackmore | Oct. 15, 1907 |
| 1,911,315 | Haner et al. | May 30, 1933 |
| 1,968,552 | Bond | July 31, 1934 |
| 2,075,100 | Dreyfus | Mar. 30, 1937 |
| 2,204,652 | Bludworth | June 18, 1940 |
| 2,246,569 | Brown | June 24, 1941 |
| 2,307,934 | Loder | Jan. 12, 1943 |
| 2,425,882 | Hull | Aug. 19, 1947 |

FOREIGN PATENTS

| Number | Country | Date |
| --- | --- | --- |
| 168,291 | Germany | Mar. 15, 1906 |

OTHER REFERENCES

Walker, "Formaldehyde," Reinhold Pub. Corp., 1944, pages 11, 138, and 139.